United States Patent
van Rensburg

(10) Patent No.: US 10,740,680 B2
(45) Date of Patent: Aug. 11, 2020

(54) SYSTEM AND METHOD FOR MESSAGE REACTION ANALYSIS

(71) Applicant: RingCentral, Inc., Belmont, CA (US)

(72) Inventor: Christopher van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/980,616

(22) Filed: May 15, 2018

(65) Prior Publication Data

US 2019/0354879 A1  Nov. 21, 2019

(51) Int. Cl.
*G06N 5/02* (2006.01)
*G06F 16/22* (2019.01)

(52) U.S. Cl.
CPC ......... *G06N 5/025* (2013.01); *G06F 16/2272* (2019.01)

(58) Field of Classification Search
CPC .............. G06N 5/025; G06F 17/30336; G06F 15/2272; G06F 16/2272
See application file for complete search history.

(56) References Cited

U.S. PATENT DOCUMENTS

| 8,495,503 | B2 | 7/2013 | Brown et al. | |
| 8,621,502 | B2 | 12/2013 | Cronin | |
| 9,342,578 | B1 | 5/2016 | Suvar | |
| 2017/0185581 | A1* | 6/2017 | Bojja | G06F 17/24 |
| 2017/0344224 | A1* | 11/2017 | Kay | G06F 3/04817 |
| 2017/0358010 | A1* | 12/2017 | Montaque | G06Q 30/0275 |
| 2018/0082313 | A1* | 3/2018 | Duggin | G06Q 30/0201 |

FOREIGN PATENT DOCUMENTS

WO  WO 2016/127248  8/2016

\* cited by examiner

*Primary Examiner* — Vincent Gonzales
*Assistant Examiner* — Kevin W Figueroa

(57) ABSTRACT

Methods, systems, and apparatus, including computer programs encoded on a computer storage medium, for detecting and analyzing user reactions to messages received. One of the methods includes obtaining reaction data characterizing a reaction of a first user to a communication sent by a second user using a first communication service, wherein the first communication service allows users to react to received communications by selecting from a predetermined set of proprietary reactions that are supported by the first communication service; analyzing the reaction data to generate standardized reaction data that characterizes a sentiment of the reaction of the first user to the communication; mapping the standardized reaction data to one or more proprietary reactions from the predetermined set of proprietary reactions that are supported by the first communication service; and providing, to the first communication service, data identifying the one or more proprietary reactions.

20 Claims, 4 Drawing Sheets

SYSTEM AND METHOD FOR MESSAGE REACTION ANALYSIS

BACKGROUND

This disclosure relates to automatically detecting user reactions to messages received during a communications session.

Users of a communication service provider system can participate in communications sessions with other users. Examples of communications sessions may include voice-over-Internet-Protocol (VOIP) calls, videoconferences, chat conversations, and so on. Certain communication services provide an interface for a user to register a reaction to a message received during a communications session.

SUMMARY

In general, an aspect of the subject matter described in this disclosure can be embodied in methods that include the actions of obtaining reaction data characterizing a reaction of a first user to a communication sent by a second user using a first communication service, wherein the first communication service allows users to react to received communications by selecting from a predetermined set of proprietary reactions that are supported by the first communication service; analyzing the reaction data to generate standardized reaction data that characterizes a sentiment of the reaction of the first user to the communication; mapping the standardized reaction data to one or more proprietary reactions from the predetermined set of proprietary reactions that are supported by the first communication service; and providing, to the first communication service, data identifying the one or more proprietary reactions.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure generally describes techniques for automating the detection of user reactions to received communications during a communications session. In particular, during a communications session between two or more users, a communication is sent from one user to other user(s) using the users' respective communication devices. The reaction of a user of the other communication device is analyzed to determine standardized reaction data that characterizes the sentiment of the reaction. The standardized reaction data is then mapped to proprietary reaction data for the communication service supporting the communications session.

Example embodiments of the subject matter described in this disclosure can be implemented so as to realize one or more of the following advantages. By automatically detecting user reactions and activating corresponding controls, a communication service can improve the user experience of the users of the communication service because the reactions of other users to their communications will be readily apparent. Additionally, associating reactions with corresponding messages can improve the search and retrieval of messages, e.g., by indexing or cataloguing messages using reactions. Reaction data can be compiled and presented to users or system administrators, e.g., on a metrics dashboard. The compiled reaction data can help administrators gain insights into the tone or overall mood of communications in an organization or to devise corresponding training programs to improve communications skills of organization members. The compiled reaction data can help users understand how their communications have been received by other users of a communication service.

Figure 1:
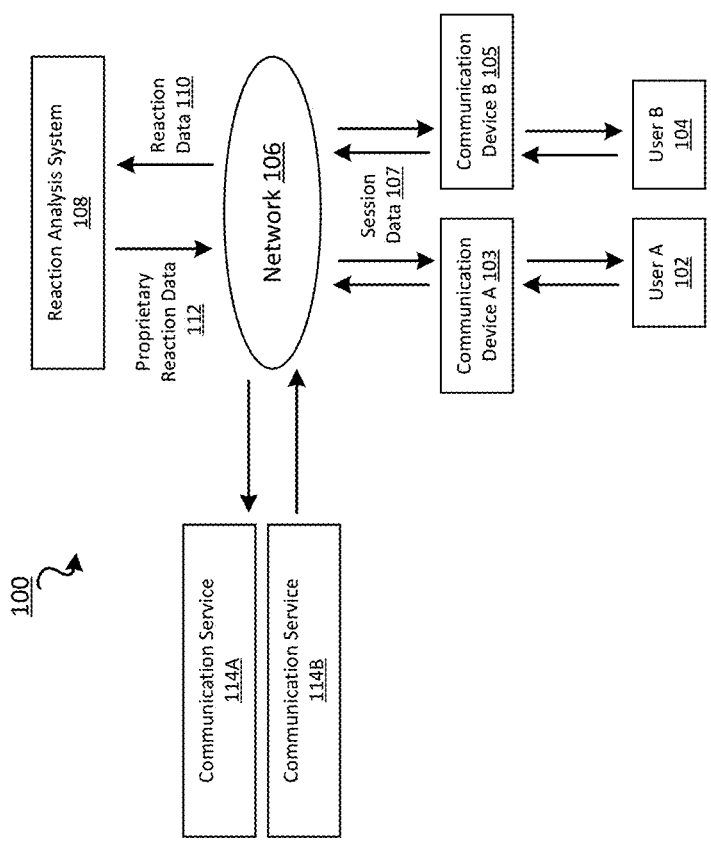
FIG. 1 shows a diagram of an example reaction analysis system.

FIG. 1 shows a diagram of an example reaction analysis system 108 according to the present disclosure. The reaction analysis system 108 is an example of a system implemented as computer programs on one or more computers in one or more locations, in which the systems, components, and techniques described herein are implemented.

The reaction analysis system 108 interfaces with one or more communication services, namely communication services 114A and 114B, over a data communication network 106. The network 106 may be, e.g., a local area network (LAN), a wide area network (WAN), a cellular network, a PSTN (public switched telephone network), a wireless network, or any combination of these.

Each of the communication services allows users of the communication service to engage in communications sessions with other users of the communication service. Users of the reaction analysis system 108, e.g. a user A 102 and a user B 104, can use various communications devices, e.g. a communications device A 103 and a communication device B 105, to communicate with each other over a network 106.

The communications devices include, for example, mobile devices (e.g. phones, or tablet computers), landline phones (e.g. plain old telephone services (POTS) phones or voice-over-Internet Protocol (VOIP) softphones), computer, audio or video conferencing consoles, or the like. The communications devices can support various means of information exchange between users, namely text messages, voice messages, video messages, and biometric signals.

In the presently described example embodiment, communication service 114A can allow the user A 102 of the communication device A 103 to engage in a communications session with the user B 104 of the communication device B 105. During the communications session, session data 107 is transmitted between the two communication devices over the network 106. A communications session can include one or more of a text session, a voice session, a video session, or other types of information exchange. In some examples, depending on the type of the communications session, different types of communications can be exchanged between the users. An example of a voice session may be a voice over IP (VOIP) call placed from the communication device A 103 to the communication device B 105. An example of a text session may be an exchange of text messages on a messaging platform. An example of a video session may be a videoconferencing call between the user A 102 and the user B 104.

Each of the communication services allows users to submit inputs reacting to communications received from other users during a communications session. In order to submit inputs reacting to a communication, the communication service can provide a user interface with controls that are selectable by the user. The controls may be activated by any appropriate user input, e.g., an input selecting a corresponding user interface element. Each control corresponds to a different proprietary reaction from a predefined set of proprietary reactions. For example, a communication service can provide an interface for users in the communications session to explicitly indicate their approval of an individual message, such as through the use of a "like" control placed alongside a received message.

Different communication services support different sets of proprietary reactions. For example, some communication services may support only a single reaction such as approval, while other communication services may support reactions indicating more diverse sentiments such as surprise, happiness, sadness, and so on. In some examples, the set of proprietary reactions from which a user can select can be different from one communication service to another.

However, in many cases users may not utilize the functionality provided by a communication service to directly submit proprietary reactions to received messages. For example, the users may find it unnatural to use a separate reaction registering interface while engaging freely in communication using a different interface, or the users may be unfamiliar with operating the separate reaction registering interface for registering a reaction. In these cases, it may still be beneficial for the communication services to monitor user reactions. In particular, by automatically detecting user reactions and automatically activating the corresponding controls, the communication service can improve the user experience of the users of the communication service because the reactions of other users to their communications will be readily apparent. Additionally, associating reactions with corresponding messages can improve the search and retrieval of messages. For example, messages can be indexed or catalogued using key-value pairs with reactions being the keys and message content being the values. As a result, messages can be quickly located by searching for the appropriate reactions.

The communication services are coupled with and interact with the reaction analysis system 108 to allow the communication services to monitor user reactions even when users do not explicitly submit them using functionality provided by the communication services. In some examples, the reaction analysis system 108 can include a set of Application Programming Interfaces (APIs) to interface with the communication services 114A-114B. The reaction analysis system 108 can make a direct HTTP request over the network 106 to the communication service 114A-114B, and process a response. Additionally, the reaction analysis system 108 can load a client library designed for the communication service 114A-114B to access corresponding APIs.

During a given communications session using a communication service, the reaction analysis system 108 automatically analyzes the reactions of participants in the communications session to communications received during the communications session to map each reaction to one of the proprietary reactions supported by the communication service.

In particular, the reaction analysis system 108 receives reaction data 110 that characterizes the reaction of a user to a communication. The reaction analysis system 108 then generates, from the received reaction data 110, proprietary reaction data 112 specific to the communication service and that maps the user reaction to one of the proprietary reactions supported by the communication service. Example communications can include one or more text messages, a segment of video with or without accompanying audio, a segment of audio, etc. The reaction data 110 can include any kind of communication data that can be collected by the communication devices or by the communication services, such as text data, voice data, video data, and biometric signal data. In some embodiments, the reaction analysis system 108 receives the reaction data 110 from the communication service. For example, the communication service collects the reaction data 110 and transmits the collected data to the system 108. In other embodiments, the communication service can cause the communication device of the user to capture and transmit the reaction data 110 directly to the reaction analysis system 108 over the network 106. Advantageously, the communication service or the communication device can collect the reaction data 110 and provide the data to the reaction analysis system 108 without needing to analyze the data. For example, the reaction analysis system 108 can receive as input raw collected data and process the raw collected data to identify the proprietary reaction or reactions that are reflected by the collected data.

As described above, different communication services support different kinds and different numbers of proprietary reactions. When the reaction analysis system 108 is configured to interact with multiple such communication services, the reaction analysis system 108 can analyze reaction data and generate proprietary reaction data for each of the multiple communication services that conforms to the proprietary reactions supported by that service.

Converting reaction data to proprietary reaction data is described in more detail below with reference to FIGS. 2 and 3.

The reaction analysis system 108 then provides the proprietary reaction data to the appropriate communication service. Once received, the communication service can record the proprietary reaction data in association with the corresponding communication, can insert the corresponding proprietary reaction into the communications sessions, e.g., by automatically selecting the control corresponding to the proprietary reaction, or both. In cases where the communication service records the proprietary reaction data, the system can also record that the reaction data was generated by analyzing the reaction of the user rather than the user having explicitly selected the reaction from a control. When the communication service compiles reaction data for later use, the service can assign a lesser weight to reactions that were generated by the response analysis system rather than directly by users.

Figure 2:
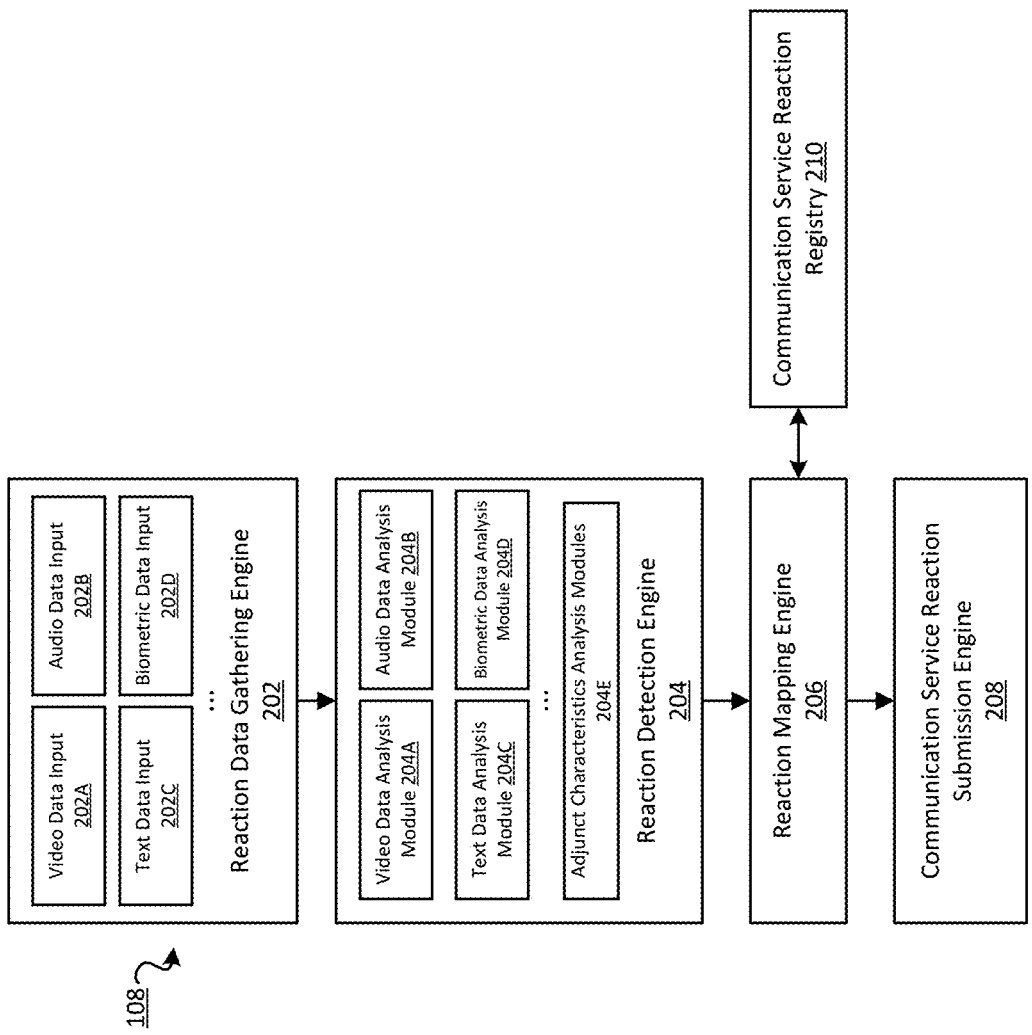
FIG. 2 shows a diagram of an example detailed view of the reaction analysis system.

FIG. 2 shows an example detailed view of the reaction analysis system 108. In the example embodiment of FIG. 2, the reaction analysis system 108 includes a reaction data gathering engine 202, a reaction detection engine 204, a reaction mapping engine 206, and a communication service reaction submission engine 208. The term "engine" is used broadly to refer to a software-based system, subsystem, device, platform, or process programmed to perform one or more specific functions. Generally, an engine will be implemented as one or more software modules or components, installed on one or more computers in one or more locations. In some cases, one or more computers (or processors) will be dedicated to a particular engine. In other cases, multiple engines can be installed and running on the same computer(s) (or processor(s)).

The reaction data gathering engine 202 gathers reaction data streams of various types generated by various supported input sources. For example, the reaction data gathering engine 202 can receive reaction data as the data is generated by a communication device or by a communication service in real time, or from recorded communications sessions. Reaction data can include data from one or more input sources, e.g., text, audio, video, or biometric signals. Example input sources include but are not limited to: (1) audio inputs, such as data captured by mobile device or computer microphones, (2) video inputs, such as data captured by mobile device front-facing cameras, computer webcams, or meeting room conferencing system cameras, (3) text inputs, such as data captured by a mobile devices with a touchscreen or a communication device with a physical keyboards, and (4) biometric data inputs, such as data captured by heartrate monitors or electro-dermal activity (EDA) sensors.

In some embodiments, the reaction data gathering engine 202 simultaneously gathers multiple reaction data types. For example, for a given communication, the reaction data gathering engine 202 can receive reaction data that includes a combination of video, audio, text, and biometric data.

In some embodiments, the reaction data gathering engine 202 supports various input sources. For example, reaction data for different communications can include reaction data from different input sources.

After the reaction data gathering engine 202 gathers reaction data, the reaction detection engine 204 then analyzes the reaction data to generate standardized reaction data. The standardized reaction data includes information characterizing the sentiment of the reaction to the communication. For example, the standardized reaction data can be a feature vector with reaction types and a respective associated confidence score for each reaction type. The confidence score for a given reaction type can represent a likelihood that the reaction type accurately captures the sentiment of the reaction to the communication.

In some embodiments, the reaction detection engine 204 includes multiple analysis modules, each configured to analyze a different type of reaction data. Each analysis module can generate modality-specific reaction data that includes a modality-specific confidence score for some or all of the reaction types in the standardized reaction data. For example, a confidence score can be generated for each reaction type that can be discerned from reaction data of that modality.

For example, the reaction detection engine 204 includes a video data analysis module 204A that analyzes video reaction data to generate modality-specific reaction data for video. The modality-specific reaction data for video can include a confidence score for some or all of the reaction types in the standardized reaction data that represents the likelihood, as extracted from the video data, that the reaction types accurately capture the sentiment of the reaction to the communication.

The video data analysis module 204A detects facial expressions or gestures in video reaction data and use the detected features to predict video-specific reaction data. For example, a smile by a user can indicate that the reaction "satisfaction" or "happiness" should have a high confidence score while a frown can indicate that the reaction "concern" or "sadness" should have a high confidence score.

In one example, the video data analysis module 204A uses a single neural network, e.g., a convolutional neural network, or other machine learning models to directly map video frames to modality-specific reaction types. The machine learning model or models are trained to map one or more video frames to confidence scores for modality-specific reaction types.

In another example, the video data analysis module 204A performs the facial expression detection in three steps: (1) locate a user's face, (2) extract facial features from the located face, and (3) classify the facial features into facial expressions and corresponding confidence scores for modality-specific reaction types. To detect faces, the video data analysis module 204A obtains an input video stream and parses it to individual image frames. The video data analysis module 204A can use one or more machine learning models, such as models that use a segmentation-based approach or regional proposal networks, to locate faces in the frames. The video data analysis module 204A then extracts facial features from located regions in the frames. Facial features can include geometric features, such as the placement or relative position of different parts of the face. The video data analysis module 204A can use one or more machine learning models to locate and track key points in the face. The video data analysis module 204A then feeds the set of facial features to another machine learning model for classification into one or more of the predefined modality-specific reaction types with associated confidence scores. Examples of machine learning models for classification include artificial neural networks, K-nearest neighbors, support vector machines, Hidden Markov Models, Bayesian networks, etc.

As another example, the reaction detection engine 204 includes an audio data analysis module 204B that analyzes audio reaction data to generate modality-specific reaction data for audio. The modality-specific reaction data for the audio can include a confidence score for some or all of the reaction types in the standardized reaction data that represents the likelihood, as extracted from the audio data, that the reaction types accurately capture the sentiment of the reaction to the communication.

The audio data analysis module 204B analyzes audio data to classify particular types of vocal utterances, such as laughter, chuckling, grunts, and so on and then map those vocal utterances to modality-specific reaction types and corresponding confidence scores. For example, the audio data analysis module 204B can analyze the audio data using a recurrent neural network or Hidden Markov Model (HMM) that has been trained to classify audio data as including one or more predetermined utterances. Alternatively, the audio data analysis module 204B can use the recurrent neural network or HMM to directly map audio frames to modality-specific reaction types and corresponding confidence scores.

In another example, the reaction detection engine 204 includes a text data analysis module 204C that analyzes text reaction data to generate modality-specific reaction data for text. The modality-specific reaction data for text can include a confidence score for some or all of the reaction types in the standardized reaction data that represents the likelihood, as extracted from the text data, that the reaction types accurately capture the sentiment of the reaction to the communication.

For example, the text reaction data analysis module 204C can process text messages using one or more natural language processing algorithms such as Naïve Bayes classifiers, generalized linear models, support vector machines, or K-means to detect a tone or sentiment of the text, and map the detected sentiment to one or more modality-specific reaction types. As another example, the text reaction data analysis module 204C can also use a rule-based approach for generating text-specific reaction data. An example rule can associate certain words or phrases (e.g. "LOL," "ROFL") with specific reactions (e.g. "Happy") and corresponding confidence scores.

In another example, the reaction detection engine 204 includes a biometric data analysis module 204D that analyzes biometric reaction data to generate modality-specific reaction data for biometric signals. The modality-specific reaction data for the biometric signals can include a confidence score for some or all of the reaction types in the standardized reaction data that represents the likelihood, as extracted from the biometric data, that the reaction types accurately capture the sentiment of the reaction to the communication.

For example, the biometric data analysis module 204D can detect reactions such as excitement or anxiety by analyzing a user's physiological signals such as heartrate or body temperature. The biometric data analysis module 204D analyzes biometric signals such as heart rate or body temperature, and then directly maps those biometric signals to the modality-specific reaction types and confidence scores, e.g., using a set of rules or a machine learning model.

If the reaction data includes data of different types (e.g. a combination of audio and video reaction data), the reaction detection engine 204 can generate multiple ambiguous or indefinite reactions. For example, during a videoconferencing communications session, the video data analysis module 204A can generate video-specific reaction data that includes a high confidence score for the reaction "happiness" from the facial expression of a user, but the audio data analysis module 204B can generate a high confidence score for the reaction "surprise" based on the pitch of the user's voice. To resolve conflicts and increase detection accuracy, the reaction detection engine 204 can combine results from different analysis modules to generate the standardized reaction data. For example, the reaction detection engine 204 can perform a weighted sum of all modality-specific reaction data based on predefined rules to generate the standardized reaction data. As another example, the reaction detection engine 204 can also include high confidence scores in the standardized reaction data only for reaction types that have confidence scores above a certain threshold score in multiple sets of modality-specific confidence data. As another example, the reaction detection engine 204 can use a machine learning model to generate reaction data based on various predictions from analysis modules. For example, the reaction detection engine 204 can use a neural network that receives as input the modality-specific reaction data from different analysis modules and generates a complete set of reaction data and corresponding confidence scores as output.

In some embodiments, the reaction detection engine 204 includes an adjunct characteristic analysis module 204E. The adjunct characteristic analysis module 204E can detect signals that crosscut multiple reaction data sources, such as signals that are observable from reaction data from multiple data sources.

For example, the adjunct characteristic analysis module 204E can analyze timing patterns in reaction data. For example, the timing patterns can be generated based on video, audio, text or biometric reaction data. Example timing patterns can include pause or hesitations in speech or text input, and can be used in conjunction with the reaction predictions of the various reaction data analysis modules to produce more definite results. For example, the example timing patterns can be used as another input when generating the standardized reaction data. The adjunct characteristic analysis module 204E can use a machine learning model or a set of rules to map the timing information to confidence scores for some or all of the standardized reaction data.

After the reaction detection engine 204 generates standardized reaction data, the reaction mapping engine 206 can map the standardized reaction data to the equivalent proprietary reactions supported by a communication service. Proprietary reactions include specific reaction types supported by a communication service and used to indicate a user's sentiment towards a message.

In some embodiments, the reaction mapping engine 206 uses definitional data obtained for the communication service to map the standardized reaction data to the equivalent proprietary reactions for the communication service.

The definitional data is a set of rules that defines a mapping from the standardized reaction data to the proprietary reactions for a particular communication service. For example, one rule might map detected standardized reaction data that has high confidence scores for the reactions "happiness" and "approval" to a proprietary reaction "Like" in a communication service.

In other embodiments, the reaction mapping engine 206 uses a machine learning model specific to the communication service to map standardized reaction data to proprietary reaction data. For example, the machine learning model can be trained on a training data set obtained from the communication history data of the communication service. The training data set can include past communications where users explicitly selected proprietary reaction types. After being trained on the training data set, the machine learning model can receive standardized reaction data as input and map the standardized reaction data to one or more proprietary reactions with confidence scores that are specific to the communication service.

In some embodiments, different communication services support logically equivalent reaction types, but by different proprietary internal names. For example, some communication services may support a standardized "like" reaction type by the internal name "like," while other communication services may support the same standardized "like" reaction type by the internal name "+1." The reaction mapping engine 206 can use the definitional data provided for the communication services to normalize the proprietary reaction type naming of different communication services.

The communication service reaction submission engine 208 submits the mapped proprietary reaction to the corresponding communication services so that the proprietary reaction can be recorded along with the original reaction data, can be used to modify the communications session by automatically selecting the control corresponding to the proprietary reaction, or both.

In some embodiments, to facilitate interaction between the system and various communication services, the communication service reaction registry 210 registers communication services supported by the system, along with associated definitional data describing proprietary reaction types supported for each communication service, and mappings of the standardized reaction types to the services' proprietary reaction types. For example, the communication service reaction registry 210 can provide an API through which communication services can submit reaction data to be analyzed by the system 108 and, optionally, definitional data to be used to map the standardized reaction data to proprietary reaction data.

Figure 3:
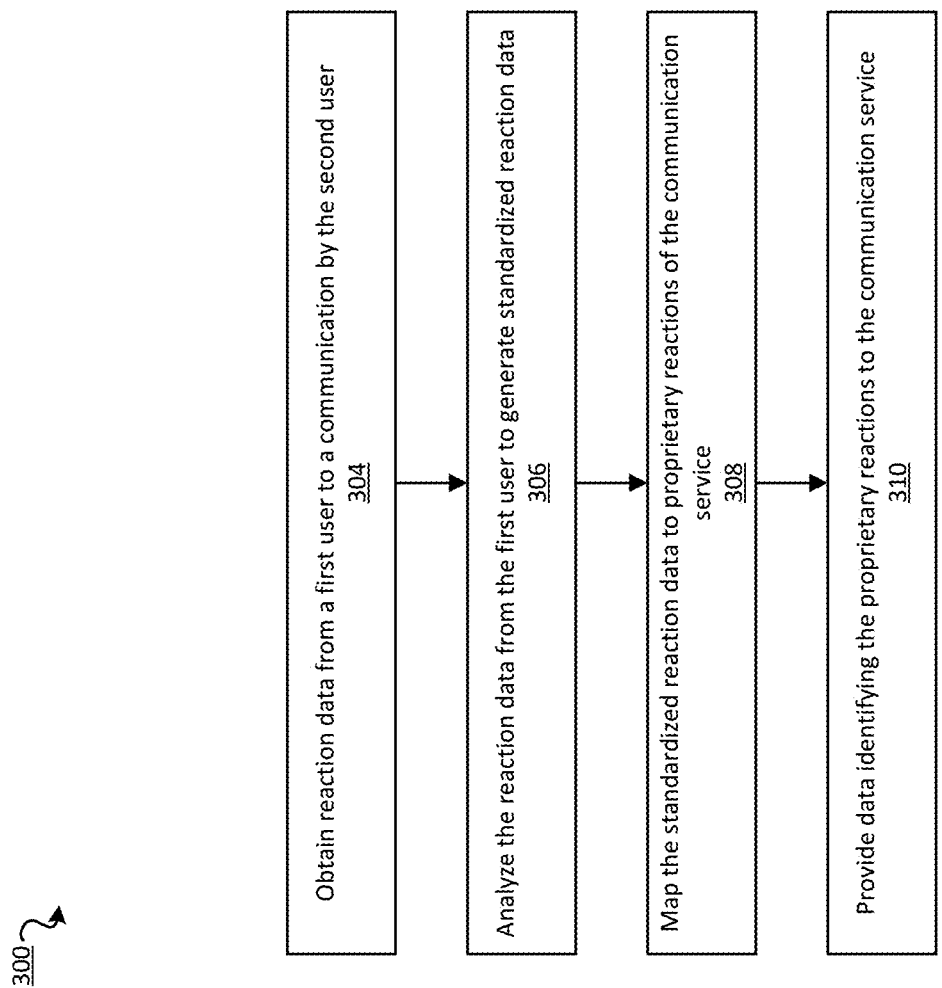
FIG. 3 is a flow diagram of an example process for detecting reaction data and generating proprietary reactions for a communication service.

FIG. 3 is a flow diagram of an example process 300 for generating proprietary reactions for a communication service. The process 300 can be performed by a system of one or more computers.

At step 304, reaction data from a first user reacting to a communication by the second user is obtained. An input processing engine, such as the reaction data gathering engine 202 described above with reference to FIG. 2, can be used to receive the reaction data. Example reaction data can include one or more of video data, audio data, text data, and biometric data.

At step 306, reaction data from the first user is analyzed to generate standardized reaction data. A reaction detection engine, e.g. the reaction detection engine 204 as described above with reference to FIG. 2, may be used to process the reaction data.

At step 308, the standardized reaction data is mapped to a set of proprietary reactions supported by the communication service. In some embodiments, a reaction mapping engine, e.g. the reaction mapping engine 206 as described above with reference to FIG. 2, can map the standardized reaction data to the proprietary reactions.

At step 310, data identifying the proprietary reactions is provided to the communication service. In some embodiments, a communication service reaction submission engine, e.g. the communication service reaction submission engine 208 as described above with reference to FIG. 2, can provide the data to the communication service.

Figure 4:
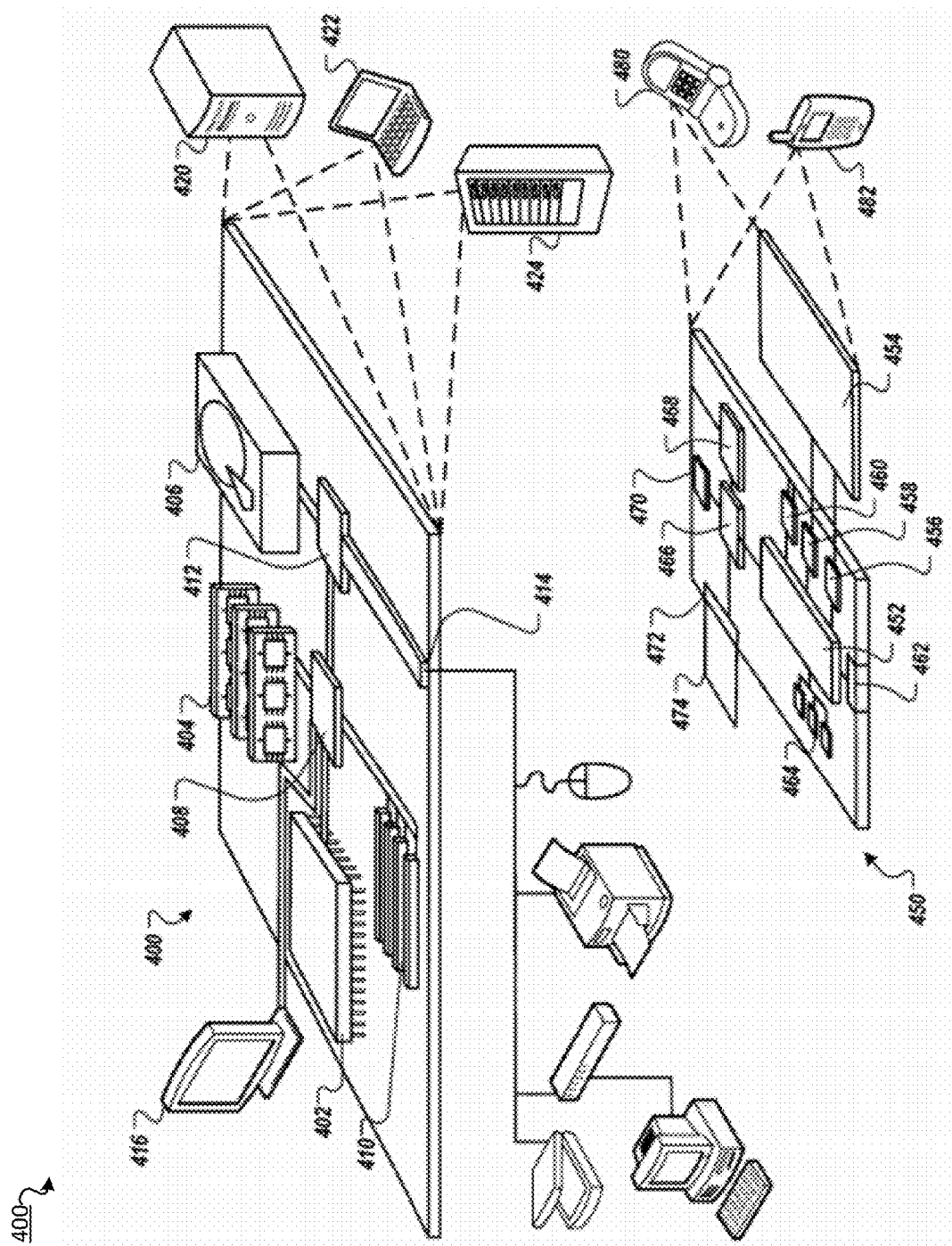
FIG. 4 shows a diagram of an example computing devices according to the present disclosure.

FIG. 4 is a block diagram of example computing devices 400 and 450. For example, either of the computing devices 400 and 450 may be one of the communications devices A 103 and B 105 of FIG. 1. Users can engage in a communication session with each other using the computing devices 400 and 450 over a network. As another example, the computing device 400 may be one of the computers included in the reaction analysis system 108 of FIG. 1. As part of the reaction analysis system 108, the computing device 400 can automatically analyze the reactions of participants in communications sessions. The reaction analysis system 108 can then generate the proprietary reaction data based on the reactions. Computing device 400 can represent various forms of digital computers, such as laptops, desktops, workstations, personal digital assistants, servers, blade servers, mainframes, and other appropriate computers. Computing device 450 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit embodiments of the inventions described and/or claimed in this document.

As shown in FIG. 4, computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other embodiments, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In some embodiments, the memory 404 is a computer-readable medium. In some embodiments, the memory 404 is a volatile memory unit or units. In some other embodiments, the memory 404 is a non-volatile memory unit or units.

The storage device 406 is capable of providing mass storage for the computing device 400. In some embodiments, the storage device 406 is a computer-readable medium. In various different embodiments, the storage device 406 may be a floppy disk device, a hard disk device, an optical disk device, or a tape device, a flash memory or other similar solid state memory device, or an array of devices, including devices in a storage area network or other configurations. In some embodiments, a computer program product is tangibly embodied in an information carrier. The computer program product contains instructions that, when executed, perform one or more methods, such as those described above. The information carrier is a computer- or machine readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In some embodiments, the high-speed controller 408 is coupled to memory 404, display 416 (e.g., through a graphics processor or accelerator), and to high-speed expansion ports 410, which may accept various expansion cards (not shown). In the embodiments, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth® or other such technologies).

The memory 464 stores information within the computing device 450. In some embodiments, the memory 464 is a computer-readable medium. In some embodiments, the memory 464 is a volatile memory unit or units. In some other embodiments, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In some embodiments, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 1270 may provide additional wireless data to device 450, which may be used as appropriate by applications running on device 450.

Device 450 may also communicate audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The invention claimed is:

1. A method comprising:
   obtaining reaction data for each of a plurality of communications, the reaction data for each communication characterizing a reaction of a corresponding first user to a communication sent by a corresponding second user using a corresponding communication service from a plurality of communication services, wherein each of the plurality of communication services allows users to react to received communications by selecting from a predetermined set of proprietary reactions that are supported by the communication service, wherein different communication services in the plurality of communication services have different sets of proprietary reactions that are supported by the communication service, and wherein the corresponding first user has not selected any proprietary reaction supported by the corresponding communication service in response to the communication sent by the corresponding second user;
   for each of the plurality of communications:
      analyzing the reaction data for the communication to generate standardized reaction data that characterizes a sentiment of the reaction of the corresponding first user to the communication, wherein the standardized reaction data comprises multiple reaction types and a respective associated confidence score for each reaction type, wherein the same set of multiple reaction types are used for all of the plurality of communication services;
      mapping, using a machine learning model, the standardized reaction data that characterizes the sentiment of the reaction of the corresponding first user to one or more proprietary reactions from the predetermined set of proprietary reactions that are supported by the corresponding communication service, wherein the machine learning model has been trained on a training data set from communication history data of the corresponding communication service to receive as input the standardized reaction data and to generate as output a score distribution over propriety reactions from the predetermined set of proprietary reactions that are supported by the corresponding communication service; and
      providing, to the corresponding communication service, data identifying the one or more proprietary reactions.

2. The method of claim 1, wherein the communication sent by the corresponding second user comprises one or more text messages.

3. The method of claim 1, wherein the reaction data for the communication sent by the corresponding second user comprises reaction data captured using a plurality of different modalities, and wherein generating the standardized reaction data comprises:
- analyzing, for each of the different modalities, the reaction data captured by the corresponding modality to generate modality-specific reaction data, wherein the modality-specific reaction data comprises one or more reaction data types and associated confidence scores; and
- combining the modality-specific reaction data for the plurality of modalities to generate the standardized reaction data.

4. The method of claim 3, wherein the reaction data types include biometric data, video data, or audio data.

5. The method of claim 1, wherein the standardized reaction data comprises a respective confidence score for each of a plurality of global reaction types, and wherein mapping the standardized reaction data to the one or more proprietary reactions that are supported by the corresponding communication service comprises:
- obtaining a set of rules that define mappings from global reaction types and confidence scores to proprietary reactions; and
- mapping the standardized reaction data to the one or more proprietary reactions that are supported by the corresponding communication service based on the set of rules.

6. The method of claim 1, wherein the training data set from the communication history data of the corresponding communication service comprises past communications where one or more users explicitly selected proprietary reactions.

7. The method of claim 1, further comprising:
- providing, to the communication service, the one or more proprietary reactions that are supported by the communication service for injecting into a communications session between the corresponding first user and the corresponding second user using the communication service; and
- indexing the communication sent by the corresponding second user using the data identifying the one or more proprietary reactions.

8. The method of claim 1 wherein the training data set includes:
(i) standardized reaction data for a plurality of past communications of each of the plurality of communication service; and
(ii) for each past communication of the plurality of past communications, a proprietary reaction that was explicitly selected in response to the past communication.

9. A system comprising one or more computers and one or more storage devices storing instructions that when executed by the one or more computers cause the one or more computers to perform operations comprising:
- obtaining reaction data for each of a plurality of communications, the reaction data for each communication characterizing a reaction of a corresponding first user to a communication sent by a corresponding second user using a corresponding communication service from a plurality of communication services, wherein each of the plurality of communication services allows users to react to received communications by selecting from a predetermined set of proprietary reactions that are supported by the communication service, wherein different communication services in the plurality of communication services have different sets of proprietary reactions that are supported by the communication service, and wherein the corresponding first user has not selected any proprietary reaction supported by the corresponding communication service in response to the communication sent by the corresponding second user;
- for each of the plurality of communications:
  - analyzing the reaction data for the communication to generate standardized reaction data that characterizes a sentiment of the reaction of the corresponding first user to the communication, wherein the standardized reaction data comprises multiple reaction types and a respective associated confidence score for each reaction type, wherein the same set of multiple reaction types are used for all of the plurality of communication services;
  - mapping, using a machine learning model, the standardized reaction data that characterizes the sentiment of the reaction of the corresponding first user to one or more proprietary reactions from the predetermined set of proprietary reactions that are supported by the corresponding communication service, wherein the machine learning model has been trained on a training data set from communication history data of the corresponding communication service to receive as input the standardized reaction data and to generate as output a score distribution over propriety reactions from the predetermined set of proprietary reactions that are supported by the corresponding communication service; and
  - providing, to the corresponding communication service, data identifying the one or more proprietary reactions.

10. The system of claim 9, wherein the communication sent by the corresponding second user comprises one or more text messages.

11. The system of claim 9, wherein the reaction data for the communication sent by the corresponding second user comprises reaction data captured using a plurality of different modalities, and wherein generating the standardized reaction data comprises:
- analyzing, for each of the different modalities, the reaction data captured by the corresponding modality to generate modality-specific reaction data, wherein the modality-specific reaction data comprises one or more reaction data types and associated confidence scores; and
- combining the modality-specific reaction data for the plurality of modalities to generate the standardized reaction data.

12. The system of claim 9, wherein the standardized reaction data comprises a respective confidence score for each of a plurality of global reaction types, and wherein mapping the standardized reaction data to the one or more proprietary reactions that are supported by the corresponding communication service comprises:
- obtaining a set of rules that define mappings from global reaction types and confidence scores to proprietary reactions; and
- mapping the standardized reaction data to the one or more proprietary reactions that are supported by the corresponding communication service based on the set of rules.

13. The system of claim 9, wherein the training data set from the communication history data of the corresponding communication service comprises past communications where one or more users explicitly selected proprietary reactions.

14. The system of claim 9, the operations further comprising:
providing, to the communication service, the one or more proprietary reactions that are supported by the communication service for injecting into a communications session between the corresponding first user and the corresponding second user using the communication service; and
indexing the communication sent by the corresponding second user using the data identifying the one or more proprietary reactions.

15. One or more non-transitory computer storage medium encoded with a computer program, the computer program storing instructions that when executed by one or more computers cause the one or more computers to perform operations comprising:
obtaining reaction data for each of a plurality of communications, the reaction data for each communication characterizing a reaction of a corresponding first user to a communication sent by a corresponding second user using a corresponding communication service from a plurality of communication services, wherein each of the plurality of communication services allows users to react to received communications by selecting from a predetermined set of proprietary reactions that are supported by the communication service, wherein different communication services in the plurality of communication services have different sets of proprietary reactions that are supported by the communication service, and wherein the corresponding first user has not selected any proprietary reaction supported by the corresponding communication service in response to the communication sent by the corresponding second user;
for each of the plurality of communications:
analyzing the reaction data for the communication to generate standardized reaction data that characterizes a sentiment of the reaction of the corresponding first user to the communication, wherein the standardized reaction data comprises multiple reaction types and a respective associated confidence score for each reaction type, wherein the same set of multiple reaction types are used for all of the plurality of communication services;
mapping, using a machine learning model, the standardized reaction data that characterizes the sentiment of the reaction of the corresponding first user to one or more proprietary reactions from the predetermined set of proprietary reactions that are supported by the corresponding communication service, wherein the machine learning model has been trained on a training data set from communication history data of the corresponding communication service to receive as input the standardized reaction data and to generate as output a score distribution over propriety reactions from the predetermined set of proprietary reactions that are supported by the corresponding communication service; and
providing, to the corresponding communication service, data identifying the one or more proprietary reactions.

16. The non-transitory computer storage medium of claim 15, wherein the communication sent by the corresponding second user comprises one or more text messages.

17. The non-transitory computer storage medium of claim 15, wherein the reaction data for the communication sent by the corresponding second user comprises reaction data captured using a plurality of different modalities, and wherein generating the standardized reaction data comprises:
analyzing, for each of the different modalities, the reaction data captured by the corresponding modality to generate modality-specific reaction data, wherein the modality-specific reaction data comprises one or more reaction data types and associated confidence scores; and
combining the modality-specific reaction data for the plurality of modalities to generate the standardized reaction data.

18. The non-transitory computer storage medium of claim 15, wherein the standardized reaction data comprises a respective confidence score for each of a plurality of global reaction types, and wherein mapping the standardized reaction data to the one or more proprietary reactions that are supported by the corresponding communication service comprises:
obtaining a set of rules that define mappings from global reaction types and confidence scores to proprietary reactions; and
mapping the standardized reaction data to the one or more proprietary reactions that are supported by the corresponding communication service based on the set of rules.

19. The non-transitory computer storage medium of claim 15, wherein the training data set from the communication history data of the corresponding communication service comprises past communications where one or more users explicitly selected proprietary reactions.

20. The method of claim 15, further comprising:
providing, to the communication service, the one or more proprietary reactions that are supported by the communication service for injecting into a communications session between the corresponding first user and the corresponding second user using the communication service; and
indexing the communication sent by the corresponding second user using the data identifying the one or more proprietary reactions.

* * * * *